(12) United States Patent
Kumar

(10) Patent No.: US 7,389,415 B1
(45) Date of Patent: Jun. 17, 2008

(54) ENABLING CRYPTOGRAPHIC FEATURES IN A CRYPTOGRAPHIC DEVICE USING MAC ADDRESSES

(75) Inventor: Jainendra Kumar, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 843 days.

(21) Appl. No.: 09/751,353

(22) Filed: Dec. 27, 2000

(51) Int. Cl.
*H04L 9/00* (2006.01)
(52) U.S. Cl. ...................................... 713/162
(58) Field of Classification Search ................ 713/162
See application file for complete search history.

(56) References Cited

U.S. PATENT DOCUMENTS 5,883,956 A * 3/1999 Le et al. .................. 713/170
5,926,478 A * 7/1999 Ghaibeh et al. ......... 370/395.51
6,308,266 B1 * 10/2001 Freeman ..................... 713/156

* cited by examiner

*Primary Examiner*—Kambiz Zand
*Assistant Examiner*—Jacob Lipman
(74) *Attorney, Agent, or Firm*—Weaver Austin Villeneuve & Sampson LLP

(57) ABSTRACT

A method and system are disclosed that provide a significant improvement for securely selecting a subset of available cryptographic functionality in a system. This is implemented by using the highest level of cryptography available in a system to encrypt the system initialization data used to select, enable, disable, or configure cryptographic features in a crypto chip. The system decrypts the encrypted data by momentarily fully enabling the crypto chip during the boot process, and using a known, system-unique, and fixed seed to generate the private key to use for decryption. The seed used is the system's MAC address (L2 LAN address—medium access control). Alternatively, the system could include a one-time use decryption-only algorithm in the boot strap code itself.

14 Claims, 2 Drawing Sheets

Secure Cryptographic Enablement Components According To The Current Invention

Secure Cryptographic Enablement Components According To The Current Invention

Method According To The Present Invention

ENABLING CRYPTOGRAPHIC FEATURES IN A CRYPTOGRAPHIC DEVICE USING MAC ADDRESSES

BACKGROUND OF THE INVENTION

1. Field of the Invention

This invention pertains generally to computer products that have encryption technology as part of the product being sold. More particularly this invention is directed to a system and method for selecting a particular level of cryptographic support when the base product provides multiple levels of cryptographic support.

2. The Prior Art

Cryptographic packages as offered in computer systems, or as part of a component sale, are well known. Cryptographic packages may consist of several types, including two-way encryption techniques based on DES, 3DES, and RC4; asymmetric encryption techniques used for public key encrypting such as RSA, DH, and DSA; and, authentication techniques based on SHA-1 and MD5.

All such solutions share a substantial number of components, be they implemented in software or hardware. Because all the cryptographic packages share so many components in common, they are implemented and offered as a single package from which one chooses which components, or level of cryptography, to enable or use. In a software implementation, the desired cryptographic support may be compiled during a system build or selectively invoked using various system initialization or configuration parameters. In a hardware implementation a chip is typically enabled for a certain type of cryptographic support during system initialization using system boot parameters.

The problem is how to provide a high degree of reliability on enabling or disabling certain cryptographic features (capabilities). This is important for several reasons. One reason is export control. Some countries are not allowed to receive certain levels of cryptography. Another reason is only allowing customers to use what they paid for. Since cryptographic implementations of all types have multiple levels of support built into them, enabling only some features in a highly reliable manner is a critical concern.

Software implementations have the advantage that they can be custom built. However, that solution also has overwhelmingly severe disadvantages. First, all known implementations of cryptographic features are notoriously compute intensive. If the cryptography in use is software based, and the system is to be used for anything other than just encryption and decryption, system performance will always degrade to a very noticeable degree. This is unacceptable, so software solutions are not as common except in dedicated security systems. In addition to poor performance, using different builds for different cryptographic support results in severe logistical problems as the number of releases grows. Thus, the only pragmatic solution is to use some kind of system initialization parameter.

Hardware implementations are far more common than software solutions because of their speed. Hardware implementations of cryptographic functions result in almost no discernable downgrade in overall system performance. Unlike software implementations, a hardware implementation will always have all the normally desired cryptographic capabilities built into one chip. Thus, the only solution for selecting a subset of those capabilities lies with selectively enabling or disabling them during system initialization.

Setting aside the software solution involving selective builds due to its high cost (extremely difficult logistical support, resulting in high costs, associated with different builds for a large number of small groups of customers), it is readily seen that the best commercially viable solution involves enabling or disabling cryptographic features using some kind of system initialization or configuration data.

Up to now, there has been little protection from clever people doing reverse engineering on a product to find out how and where system initialization parameters are kept and used. Thus, there is a real need for any method or system that would provide better protection of cryptographic enabling or disabling features that must be used to configure systems according to the country sold, or a customers purchasing decision.

BRIEF DESCRIPTION OF THE INVENTION

The present invention discloses a method and system for providing cryptographic initialization data during the system boot process in a highly secure fashion. The cryptographic initialization data is first encompassed in a token, where the token may be of whatever length needed by the cryptographic algorithm being used coupled with other security concerns. The token is then encrypted using the highest level of encryption available on the target system, that is, the system where this token will be used.

The key or keys used for the encryption process are generated using the target system's MAC (medium access control, L2 layer) address. The MAC address is used because the MAC address is a unique number assigned to each system by a manufacturer—this means that any configuration data can be established for a unique system, without the key being reproducible or useable on any other system.

After the token is encrypted, it is put into non-volatile memory on the target system. This memory must be memory that is available to the system's CPU during system initialization, and will be on the CPU's local bus. There will also be a cryptographic chip on the same local CPU bus. The crypto chip will be initialized by the CPU during the very beginning of the system booting process, along with other devices found on the local CPU bus.

Early in the boot process the boot strap code will initialize the crypto chip. This will be done by first fully enabling the crypto chip, using the MAC address to generate either the key or a private key (depending on the level and algorithms used in the crypto ship), decrypting the token, and then using the values in the token to set the crypto chip to its run time state.

BRIEF DESCRIPTION OF THE DRAWING FIGURES

DETAILED DESCRIPTION OF PREFERRED EMBODIMENTS

Person of ordinary skill in the art will realize that the following description of the present invention is illustrative only and not in any way limiting. Other embodiments of the invention will readily suggest themselves to such skilled persons having the benefit of this disclosure.

The present invention discloses a method and system for allowing a system to be booted and used with a specified subset of cryptographic features or capabilities enabled, rather than a full set, with a significantly higher degree of assurance than reading initialization data from a standard ROM containing system initialization and configuration data.

Figure 1:
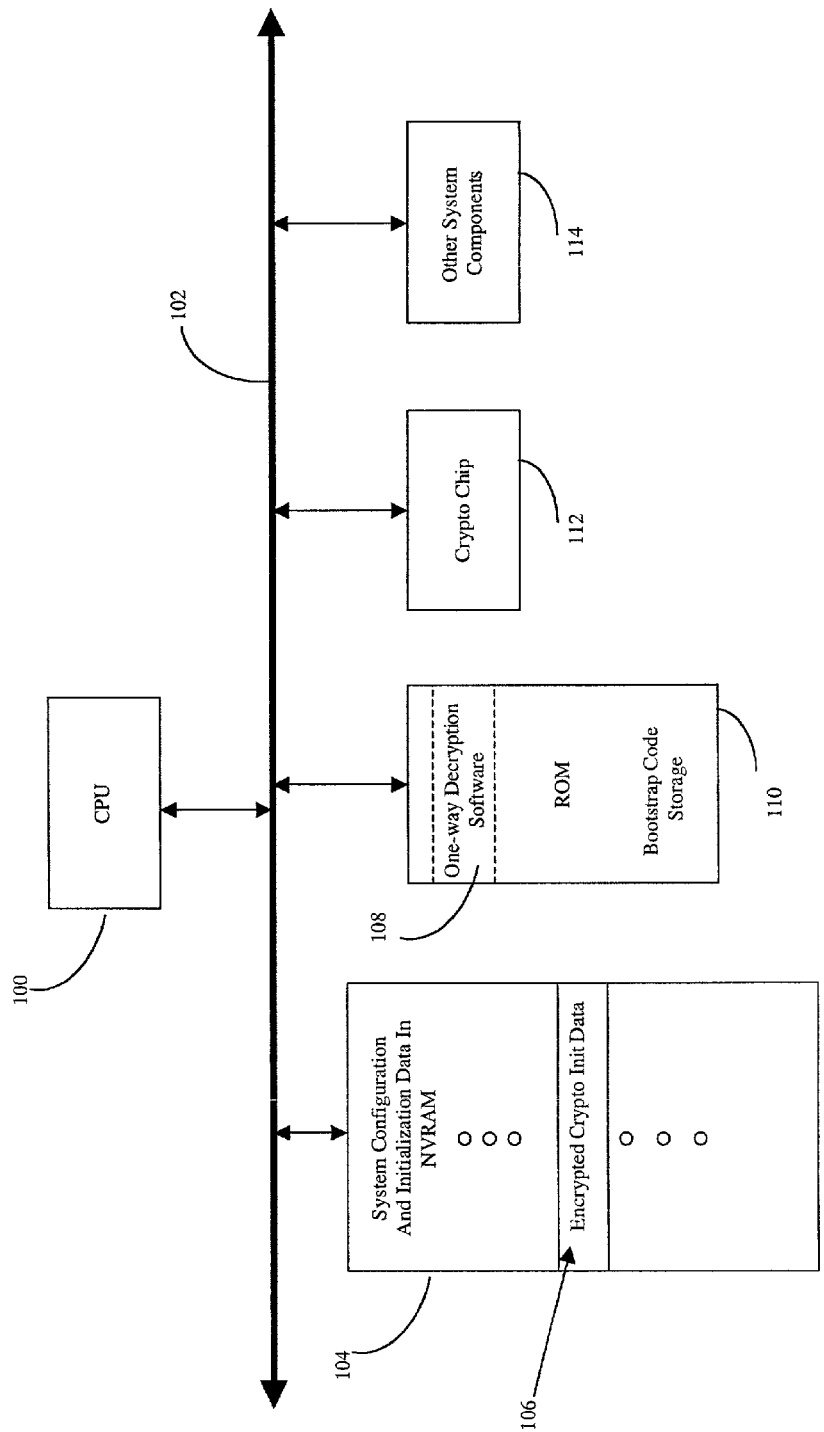
FIG. 1 is a block diagram of a system embodying the present invention.

FIG. 1 shows components as they relate to the initial booting process of a system and embodying the present invention. CPU 100 will first go through a self-test and self-initialization process. After it completes its own testing, CPU 100 will use the local CPU bus 102 to talk with certain components to start the initialization process of other devices. Typically there will be some amount of NVRAM, shown as NVRAM 104, which contains system initialization and configuration data. The unique aspect of NVRAM 104 is a particular portion of system initialization data, shown as encrypted crypto init data 106. Crypto init data 106 contains settings that the system boot code will use to enable and/or disable specified cryptographic features available in the system.

For the purpose of the present disclosure, the choices made to enable or disable any particular subset of cryptographic features is unimportant. However they are made, including considerations such as the country being shipped to and what the customer paid for, there will be a number of bits set that tell the boot code how to configure the system's cryptographic capabilities. This encrypted configuration data will be made available (as will be other configuration and initialization data) at the appropriate point during system assembly so that the specified values will be blasted (or otherwise loaded) into an area of system initialization values on some type of non-volatile memory. System initialization NVRAM is a preferred embodiment of the present invention, but the encrypted data (token, string, block) may be stored in any available non-volatile memory located on the CPU's local bus, to which the CPU has access before other devices are initialized. Generally, this procedure will use traditional and well established assembly techniques for system integration and assembly.

Crypto init data 106 is encrypted using the highest level of cryptography available in the system. For example, if DES and 3DES is available to CPU 100, then 3DES will be used to encrypt the crypto init data 106. This prevents the situation of arising where a lower-level of cryptographic protection is applied to a key (initialization bits, in this case) than the key (bits) are protecting, and provides the maximum amount of protection available to the key (bits), thereby maximizing assurance.

The boot strap code will typically be kept in ROM 110. When the CPU is ready to start initializing the system, the code executes a jump instruction to a specified location in ROM 100 and starts executing the instructions found there. Since this code is executed before any other code, the ROM must be accessible to and addressable by the CPU before other devices that need initialization. At some point in the instruction stream, the boot strap code will be ready to configure the cryptographic capabilities of the system. Typically this will involve a set of instructions that will enable and disable certain pins on crypto chip 112. In order to carry out the configuration, the crypto init data 106 must be decrypted.

The decryption process may be carried out in one of two ways. First, there may be a one-way decryption algorithm written into the boot code, shown as one-way decryption software 108. Although this method may be used, it has drawbacks. The most notable is that including the one-way decryption software in the ROM uses a relatively large amount of space in a very space-constrained environment. It also adds unwanted complexity to the boot strap code in general—most systems are designed to keep this code to an absolute minimum. Another solution, and the preferred embodiment, is to bring up (fully enable) crypto chip 112, and use its functionality to decrypt the crypto init data 106. As soon as the decryption is complete, crypto chip 112 would be brought back down (disabled). After processing the now decrypted crypto init data, CPU 100 would then bring crypto chip 112 back up in the state for which the current machine is licensed or legally allowed.

After processing the crypto init data in this fashion, the CPU would then continue to initialize other components on local CPU bus 102, shown generally as other system components 114. Finally, the components on local CPU bus 102 would be up and running, at which point the rest of the system can be initialized and brought up (i.e., those components not on local CPU bus 102). For those familiar with IBM-compatible PCs, this would typically be the stage where the mother board was up but the peripheral devices were still to be configured.

Figure 2:
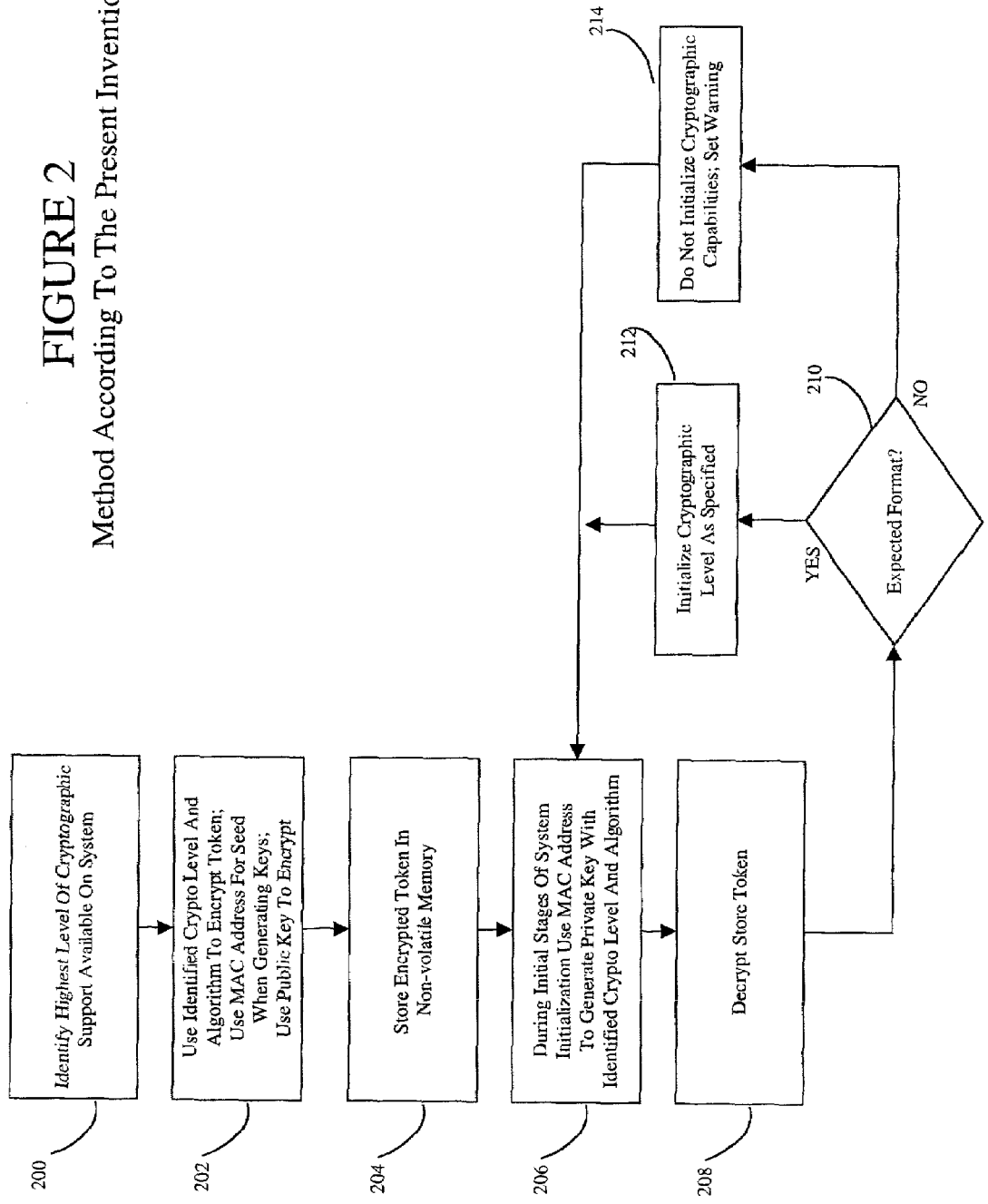
FIG. 2 is a flow chart according to the present invention.

FIG. 2 shows a process using the present invention. The initial stage is shown in box 200, which typically would occur during initial system build. However, this could take place anytime a system had major components replaced at an authorized service center or other similar situations. The action taken in box 200 is to identify the highest level of cryptographic support available in the system. In the preferred embodiment, this will be the highest level of cryptographic support available in a crypto chip supplied with the system. Associated with the identified level of crypto support will be a known algorithm, such as DES, 3DES, RSA, etc. Box 200 is left and box 202 entered.

The actions taken in box 202 are to use the identified crypto level and its associated algorithm, coupled with this system's MAC address, and generate a public and private key. The MAC address is the L2 LAN address, the Medium Access Control address, assigned to this system; MAC does not refer to message authentication code in this context. For the purposes of this disclosure, if the word MAC is used without explanation it is intended to refer to the layer 2 medium access control address used in LANs.

Although one preferred embodiment of the present invention uses the MAC address to generate a key or keys for use with the cipher algorithms found in the system, it will be seen by one of ordinary skill in the art and with the benefit of the present disclosure that other system-specific or system-unique identifiers or system-specific or system-unique information that can be constituted as an identifier for use in generating keys could be used. One such example would be a unique mother board serial number assigned by the manufacturer. Other similar solutions will come readily to mind.

The public key is used to encrypt a string of bytes, a 64-byte block, or whatever unit is needed or most efficient for the crypto algorithm being used. Embedded in the encrypted data will be this system's cryptographic configuration data. As will be readily recognized by a person having ordinary skill in the art and with the benefit of the present disclosure, there may be many variances in this step depending on the kind and type of use to which the encrypted block, token, string, etc., will be used. For example, it would typically be the case that the encrypted data would be long enough to form a recognizable pattern, along with encompassing the crypto system initialization data, so that any tampering would be evident immediately. Considerations such as that just described, as well as any related considerations as are well known in the field, are intended to be included in these steps. Such considerations will follow the known practices in the security and crypto fields. Examples of such considerations may be found in standard texts in the area, an example being "Cryptography And Network Security, Principles And Practice" by W. Stallings.

Referring back to FIG. 2, after the configuration data is embodied in a desired form and that form encrypted, box 202 is left and box 204 entered.

The action taken in box 204 is to store the encrypted data (block, string, token, etc.) in non-volatile memory available to the CPU on the CPU's local bus. The encrypted data could typically be in either system configuration and initialization ROM or in the NVRAM which also holds the boot strap code, as discussed above. After storing the encrypted data, box 204 is left and box 206 entered.

Box 206 represents the first box whose actions will occur during system boot. Boxes 200 through 204 are those actions taken to prepare the system so that when the system boots, the system will boot with the intended configuration; boxes 206 through 214 are those actions taken every time the system is booted. By the time the actions in box 206 are started, the CPU will have finished its own internal initializations, including power-on self test checks, and will be starting the process of initializing devices found on local bus of the CPU. To perform initialization, the CPU will have started executing boot strap code out of NVRAM, where the boot strap code is stored. At a certain point during the execution of the boot strap code, the crypto capabilities of the system must be configured to the desired level. When configuration of the crypto capabilities in the code is reached, the first step will be to fully enable the crypto chip, and using the MAC address, generate the key pairs. Using the private key, the encrypted token is decrypted. As will be remembered from the description given above, when using the word "token" any amount of encrypted data is meant—the actual amount of encrypted data to be decrypted will be determined based on considerations including, but not limited to, the highest level of encryption available on this chip or on this system, the algorithms used in that level of encryption, and the type of checking to be done (i.e., the present invention may be used with authentication mechanisms as well as decryption mechanisms).

After decrypting the encrypted token, box 208 is left and decision diamond 210 entered. The question to be answered at this point is if the decrypted token has the format (or value or other recognizable measure) expected. If the token does not, then the "NO" exit is taken and box 214 entered. The actions taken in box 214 are to disable the crypto chip entirely and set a system warning that security has been compromised.

As will be readily apparent to one of ordinary skill in the art and with the benefit of the present disclosure, any number of choices can be made instead of the ones just described for box 214 while staying fully within the scope of the disclosed invention. For example, the system could refuse to initialize altogether. Or, the system could be brought up with some minimal amount of, or a specified subset of, crypto features such as decryption-only (to allow some processing to take place in a mission critical application). In addition, the "set warning" step may be as simple as setting one status bit high, or as complex as issuing a warning to other systems on the LAN and to the system operator that this system has apparently been compromised. These configuration and action decisions will depend on the environment in which the system is to be used; box 214 is intended to represent all such possibilities.

After the actions to take in box 214 are completed, the present method proceeds back to box 206 to wait for the next system boot.

Returning to decision diamond 210, if the decrypted token looks as it is expected to look, the "YES" exit is taken to box 212. The action to take in box 212 is to reconfigure the crypto capabilities of the system in accordance with the decrypted token. This may involve anything from bringing the crypto chip back down and then bringing it back up with a different set of pins and options enabled/disabled, to enabling/disabling some of the pins or options already enabled/disabled, or simply continuing on if the crypto capabilities allowed in the decrypted token are the same as those enabled to carry out the decryption of the token.

After the crypto capabilities have been set, box 212 is left and the process returns to box 206, waiting for the next system boot event.

The present invention provides a significantly higher degree of security and assurance than that provided in the prior art, where system initialization data was kept in plain text form. In addition, the added protection is gained using a very minimal amount of new components or additional boot strap code size, so is therefore very cost effective.

By encrypting the cryptography initialization data using the highest level of cryptography available on the system, anyone trying to enable crypto features to which they are not supposed to have access by changing the encrypted system init data will, of necessity, already have the use of the highest level of protection the system has to offer—from a security standpoint, nothing has been lost.

The only other way around the encrypted cryptographic initialization data would be to replace the boot strap code. This is a significantly more difficult task than setting a few initialization bits. Anyone who has the engineering capability and resources to replace the bootstrap code with their own code has the ability to use the crypto chip directly—this would be functionally equivalent to buying the system and installing the crypto chip in another box. Having that set of resources available means other avenues of attack, beyond the scope of any type of protection that could be offered in any type of boot strap code, are available to the perpetrators. Thus, the present invention provides the maximum amount of assurance available when using standard commercial practices.

The present invention has been partially described through the use of a flow chart. As is appreciated by those of ordinary skill in the art and with the benefit of the present disclosure, the procedures described herein may be repeated as continuously, as often, or as little as necessary to satisfy the needs described. Specifics or order of steps may vary without departing from the basic concepts of the present invention.

There will be a large number of possible ways of representing the data and the program that will be used with the present invention, and there will be many options for storing the data and the program on machine readable media. All such implementations are contemplated by the present invention, and may be used while staying within the spirit of the disclosure. It is contemplated that any media suitable for using and retrieving the data and the program is within the scope of the present invention. Examples could include magnetic, optical, or semiconductor media.

While embodiments and applications of this invention have been shown and described, it will be apparent to those or ordinary skill in the art and with the benefit of the present disclosure that many more modifications than mentioned above are possible without departing from the inventive concepts contained herein. The invention, therefore, is not to be restricted except in the spirit of the associated claims.

What is claimed is:

1. A cryptographic feature enablement system comprising:
   a processing unit;
   a cryptographic chip including circuitry configured to perform encryption and decryption for each of a plurality of cryptographic systems wherein each of said plurality of cryptographic systems provides a different level of security;
   a non-volatile read/write memory storing an encrypted token including encrypted initialization data for enabling said cryptographic chip to perform encryption and decryption for one of said plurality of cryptographic systems in said cryptographic chip that provides a highest level of security in said cryptographic chip, wherein the encrypted token was encrypted using a Media Access Control (MAC) address of the cryptographic feature enablement system;
   a bus connecting said processing unit to said non-volatile memory and said cryptographic chip to transmit data between said processing unit, said non-volatile memory, and said cryptographic chip; and
   token decryption circuitry in said non-volatile memory to decrypt said encrypted initialization data in said encrypted token wherein said initialization data enables said circuitry in said cryptographic chip to perform encryption and decryption of data for said one of said plurality of cryptographic systems that provides said highest level of security.

2. The cryptographic feature enablement system of claim 1 wherein said at least one non-volatile read/write memory comprises FLASH memory.

3. A method for initializing cryptographic functionality in a system, the method comprising:
   starting the boot process in a system;
   using a MAC address of said system to generate a key;
   decrypting an encrypted token stored in a non-volatile memory using said key wherein said encrypted token includes encrypted encryption initialization data;
   determining whether said decrypted encryption initialization data from said encrypted token is useable for a cryptographic chip in said system; and
   initializing said cryptographic chip to perform encryption and decryption in one of a plurality of cryptographic systems using said decrypted encryption initialization data responsive to a determination that said encryption initialization data is usable for said cryptographic chip wherein said cryptographic chip includes circuitry configured to encrypt and decrypt data in each of a plurality of cryptographic systems each providing a different level of security and said one of said plurality of cryptographic systems provides a highest level of security.

4. A program storage device readable by a machine, tangibly embodying a program of instructions executable by a machine for initializing cryptographic functionality in a system, the method comprising:
   starting the boot process in a system;
   using a MAC address of said system to generate a key;
   decrypting an encrypted token stored in a non-volatile memory using said key wherein said encrypted token includes encrypted encryption initialization data;
   determining whether said decrypted encryption initialization data from said encrypted token is useable for a cryptographic chip in said system; and
   initializing said cryptographic chip to perform encryption and decryption in one of a plurality of cryptographic systems using said decrypted encryption initialization data responsive to a determination that said encryption initialization data is usable for said cryptographic chip wherein each of said plurality of cryptographic system provides a different level of security and said one of said plurality of cryptographic systems provides a highest level of security.

5. A system for initializing cryptographic functionality in a system, the system comprising:
   means for starting the boot process in a system;
   means for using a MAC address of said system to generate a key;
   means for decrypting an encrypted token stored in a non-volatile memory using said key wherein said encrypted token includes encrypted encryption initialization data;
   means for determining whether said decrypted encryption initialization data from said encrypted token is useable for a cryptographic chip in said system; and
   means for initializing said cryptographic chip to perform encryption and decryption in one of a plurality of cryptographic systems using said decrypted encryption initialization data responsive to a determination that said encryption initialization data is usable for said cryptographic chip wherein said cryptographic chip provides said plurality of cryptographic systems wherein each of said plurality of cryptographic systems provides a different level of security and said one of said plurality of cryptographic systems provides a highest level of security.

6. A method for installing cryptographic initialization data in a system for use during system booting, the method comprising:
   identifying a MAC address of said system;
   generating a cryptographic key using said the MAC address;
   using said cryptographic key to encrypt a token, wherein said token includes cryptographic initialization data applicable to a cryptographic chip in said system to cause said cryptographic chip to decrypt data in one of a plurality of encryption systems wherein said cryptographic chip provides a plurality of cryptographic systems wherein each of said plurality of cryptographic systems provides a different level of security and said one of said plurality of cryptographic systems provides a highest level of security; and,
   writing said encrypted token in non-volatile memory of said system.

7. The method of claim 6 where said non-volatile memory is FLASH memory.

8. The method of claim 6 where said generation of at least one key further comprises generating a public key and a private key, and choosing said public key to encrypt said token and choosing said private key to use for decrypting said token.

9. A program storage device readable by a machine, tangibly embodying a program of instructions executable by a machine for installing cryptographic initialization data in a system for use during system booting, the method comprising:
   identifying a MAC address of said system;
   generating a cryptographic key using said MAC address;
   using said cryptographic key to encrypt a token, where said token comprises cryptographic initialization data for directing a cryptographic chip in said system to encrypt and decrypt data using one of a plurality of cryptographic systems said cryptographic chip is configured to perform and wherein each of said plurality of cryptographic systems perform a different level of security and said one of said plurality of cryptographic systems selected provides a highest level of security; and writing said encrypted token in non-volatile memory in said system, where said non-volatile memory is configured to be accessible by a CPU in said system during system initialization.

10. The method of claim 9 where said non-volatile memory is FLASH memory.

11. The method of claim 9 where said generation of at least one key further comprises generating a public key and a private key, and choosing said public key to encrypt said token and choosing said private key to use for decrypting said token.

12. A system for installing cryptographic initialization data in a system for use during system booting comprising:
   means for identifying a MAC address of said system;
   means for generating a cryptographic key using said MAC address;
   means for using said cryptographic key of said at least one keys to encrypt a token, where said token comprises cryptographic initialization data for directing a cryptographic chip in said system to encrypt and decrypt data using one of a plurality of cryptographic systems said cryptographic chip is configured to perform and wherein each of said plurality of cryptographic systems perform a different level of security and said one of said plurality of cryptographic systems selected provides a highest level of security; and means for writing said encrypted token in non-volatile memory in said system, where said non-volatile memory is configured to be accessible by a CPU in said system during system initialization.

13. The system of claim 12 where said non-volatile memory is FLASH memory.

14. The system of claim 12 where said means for generation of at least one key further comprises generating a public key and a private key, and choosing said public key to encrypt said token and choosing said private key to use for decrypting said token.

* * * * *